United States Patent
Bruening et al.

(10) Patent No.: US 6,551,515 B1
(45) Date of Patent: Apr. 22, 2003

(54) PARTICULATE SOILD SUPPORTS FUNCTIONALIZED WITH EGTA LIGANDS

(75) Inventors: Ronald L. Bruening, American Fork, UT (US); Krzysztof E. Krakowiak, American Fork, UT (US)

(73) Assignee: IBC Advanced Technologies, Inc., American Fork, UT (US)

( * ) Notice: Subject to any disclaimer, the term of this patent is extended or adjusted under 35 U.S.C. 154(b) by 0 days.

(21) Appl. No.: 09/838,663

(22) Filed: Apr. 19, 2001

(51) Int. Cl.⁷ .............................................. B01D 15/00
(52) U.S. Cl. ...................... 210/670; 210/679; 210/687; 210/688; 502/401; 502/402; 502/407; 502/415
(58) Field of Search ................... 210/670, 679, 210/681, 687, 688; 502/401, 402, 407, 415

(56) References Cited

U.S. PATENT DOCUMENTS

| | | | |
|---|---|---|---|
| 4,618,533 A | 10/1986 | Steuck ..................... 428/315.7 |
| 4,943,375 A | 7/1990 | Bradshaw et al. .......... 210/674 |
| 4,952,321 A | 8/1990 | Bradshaw et al. .......... 210/670 |
| 4,959,153 A | 9/1990 | Bradshaw et al. .......... 210/670 |
| 4,960,882 A | 10/1990 | Bradshaw et al. .......... 540/468 |
| 5,039,419 A | 8/1991 | Bradshaw et al. ....... 210/502.1 |
| 5,071,819 A | 12/1991 | Tarbet et al. ................ 502/401 |
| 5,078,978 A | 1/1992 | Tarbet et al. .................. 423/22 |
| 5,084,430 A | 1/1992 | Tarbet et al. ................ 502/401 |
| 5,173,470 A | 12/1992 | Bruening et al. ........... 502/401 |
| 5,179,213 A | 1/1993 | Bradshaw et al. ............. 549/3 |
| 5,182,251 A | 1/1993 | Bruening et al. ........... 502/401 |
| 5,190,661 A | 3/1993 | Bruening et al. ........... 210/670 |
| 5,244,856 A | 9/1993 | Bruening et al. ........... 502/158 |
| 5,250,188 A | 10/1993 | Bruening et al. ........... 210/672 |
| 5,273,660 A | 12/1993 | Bruening et al. ........... 210/670 |
| 5,334,316 A | 8/1994 | Bruening et al. ........... 210/670 |
| 5,393,892 A | 2/1995 | Krakowiak et al. ......... 549/214 |
| 5,547,760 A | 8/1996 | Tarbet et al. ................ 428/422 |
| 5,571,378 A * | 11/1996 | Elofson et al. ............... 162/65 |
| 5,618,433 A | 4/1997 | Tarbet et al. ................ 210/634 |
| 5,622,996 A | 4/1997 | Fish ............................ 521/33 |
| 5,624,901 A * | 4/1997 | Raymond et al. ............. 514/17 |
| 5,785,977 A | 7/1998 | Breithbarth .................. 424/401 |
| 5,980,987 A | 11/1999 | Tarbet et al. ................ 427/245 |
| 6,071,416 A * | 6/2000 | Bruening et al. ........... 210/670 |
| 6,232,265 B1 * | 5/2001 | Bruening et al. ........... 502/401 |

* cited by examiner

Primary Examiner—Ivars Cintins

(57) ABSTRACT

Compositions and methods for selectively binding specific metal ions, such as $Ca^{2+}$ and $Cd^{2+}$, contained in a source solution are disclosed and described. This is accomplished by the use of a composition comprised of an EGTA ligand covalently bonded to a particulate solid supports through a hydrophilic spacer. The composition formula of the present invention is SS—A—X—L where SS is a particulate solid support such as silica or a polymeric bead, A is a covalent linkage mechanism, X is a hydrophilic spacer grouping, L is an EGTA ligand with the proviso that when SS is a particulate organic polymer, A—X may be combined as a single covalent linkage. The separation is accomplished by passing a source solution containing the ions to be separated through a column containing the particulate composition, causing the selected ions to be complexed to the EGTA ligand and subsequently removing the selected ions from the column or other separation device by passing an aqueous receiving solution through the separation device and quantitatively stripping the selected ions from the EGTA ligand.

15 Claims, No Drawings

PARTICULATE SOILD SUPPORTS FUNCTIONALIZED WITH EGTA LIGANDS

BACKGROUND OF THE INVENTION

Effective methods for the recovery and/or separation of particular divalent metal ions, such as (a) $Ca^{2+}$ from source solutions containing $Mg^{2+}$ and/or other ions and (b) $Cd^{2+}$ from source solutions containing $Zn^{2+}$ and/or other ions, are of great importance in modern technology. It is particularly difficult to remove these particular metal ions in the presence of moderate to strong acids and soluble complexing or chelating agents, such as the halide ions, which have a high affinity for the desired metal ions. It is also difficult to remove the aforementioned divalent metal ions when they are present at low concentrations in solutions containing other metal ions at much greater concentrations. Hence, there is a real need for a process to selectively concentrate certain divalent metal ions when present at low concentrations and particularly when in the presence of acid solutions and other complexing agents.

Some methods for the recovery of divalent metal cations from solution are known in the art. However, the removal and/or separation of specific divalent metal cations is often complicated by a myriad of conditions including the presence of other divalent cations, the presence of other cations in very high concentrations and the presence of other chelating agents. It is also known that ligands present as solutes in a solvent have the ability to selectively form strong bonds with particular ions or groups of ions present as solutes in the same solvent according to size, donor atom-related properties and other known selectivity characteristics.

Ethyleneglycol-bis-($\beta$-aminoethyl ether)-N,N,N',N'-tetraacetic acid and (ethylenediamine)tetraacetic acid, commonly referred to as EGTA and EDTA respectively, are both ligands that may be used as solutes to complex divalent ions. However, EGTA has a greater selective preference for larger divalent metal ions than EDTA. See *Critical Stability Constants, Volume 1: Amino Acids*, A. E. Martell & R. M. Smith, Plenum Press, N.Y. & London, 1974. Therefore, EGTA is an important ligand for use in complexing larger divalent metal ions.

This being the case, researchers have not previously been able to incorporate EGTA into phase separation systems. This is significant because EGTA present in solution as a solute simply acts to complex selected ions, but does not provide a means for their separation. Specifically, never before has EGTA been successfully covalently bonded to inorganic and/or organic solid supports. As such, EGTA bonded to solid supports have not been used in phase separation processes for removing, separating and concentrating larger ionic radii or desired divalent ions from solutions, particularly where such desired ions are present in solutions with smaller and/or similar ions present at a much higher concentration.

As such, it would be useful to provide a composition and method for removing, separating, and/or concentrating certain desired divalent metal ions in solution from other ions, such as (a) $Ca^{2+}$ from $Mg^{2+}$ and/or (b) $Cd^{2+}$ from $Zn^{2+}$, even when the desired ion is present at a low concentration.

SUMMARY OF THE INVENTION

The present invention is drawn to novel porous and/or non-porous particulate organic and/or inorganic solid supports containing EGTA ligands covalently bonded to the solid support through a spacer. When the particulate solid support is an organic resin or polymer, the EGTA ligand may be bonded directly to an activated polar group on the polymer. The invention is also drawn to methods for removing, separating, and/or concentrating certain desired divalent metal ions including (a) $Ca^{2+}$ from source solutions containing $Mg^{2+}$ and/or other ions and (b) $Cd^{2+}$ from source solutions containing $Zn^{2+}$ and/or other ions. In fact, the removal of these ions ($Cd^{2+}$ and/or $Ca^2$)may occur when they are present at from very low to very high concentrations, i.e., from ppb to g/l levels of $Cd^{2+}$ and/or $Ca^{2+}$.

The concentration of the desired ions is accomplished by forming a complex of the desired ions with an EGTA ligand bound solid support material by flowing a source solution containing the desired ions through a column or other separation device packed with EGTA ligand bound solid support material. This process enables the desired ions to complex with the EGTA ligand attached to the solid.support material. The metal ion and the EGTA ligand are then decoupled by flowing a receiving liquid through the column or other separation device (in much smaller volume than the volume of source solution passed through the column) to remove and concentrate the desired ions in the receiving liquid solution. The receiving liquid or recovery solution forms a stronger complex with the desired ions than does the EGTA, or alternatively, temporarily forms a stronger interaction with the EGTA ligand than do the desired metal ions, and thus, the desired metal ions are quantitatively stripped from the ligand in a concentrated form in the receiving solution. The recovery of desired ions from the receiving liquid may be accomplished by various methods commonly known in the art.

DETAILED DESCRIPTION OF THE INVENTION

The present invention provides a composition and method for the removal and/or separation of particular divalent metal ions including $Ca^{2+}$ and $Cd^{2+}$ present in low concentrations from a solution utilizing an EGTA ligand attached to a solid support. The present invention is particularly adaptable to the removal of (a) $Cd^{2+}$ from source solutions containing $Zn^{2+}$ and/or other ions and (b) $Ca^{2+}$ from source solutions containing $Mg^{2+}$ and/or other ions. Further, the invention may be carried out in moderately acidic solutions, e.g., solutions with a pH greater than about 3.0. Furthermore, the desired selectivity and interaction strength is unexpectedly high despite the fact that one of the four carboxylic acid groups of the ligand is used to attach the ligand to the solid support.

The present invention requires that the EGTA ligand be covalently bonded to an organic polymeric or inorganic particulate solid support that can be porous or nonporous. If an inorganic solid support is used, a hydrophilic spacer is linked to a silicon, carbon, nitrogen, oxygen or sulfur atom and is further covalently bonded to the solid support. If an organic polymer or resin solid support is used, the ligand can contain a functional group reactive with a constituent of the polymer (such as an activated polar group). In either case, the structure may be represented by Formula 1, as follows:

  Formula 1 where SS is a porous or non-porous particulate solid support, A is a covalent linkage mechanism, X is a hydrophilic spacer grouping and L is an EGTA ligand. If an organic resin or polymer is used for the solid support, the covalent linkage A and spacer X will then be integrated, and may actually be a single linkage, formed by the covalent bond formed by the reaction between the activated polar group from the polymer and the functional group from the ligand.

The SS—A—X— portion of Formula 1 is well known for use with ion binding ligands. Preferably, the solid support "SS" is an inorganic and/or organic particulate support material selected from the group consisting of sand, silicas, silicates, silica gel, glass, glass beads, glass fibers, alumina, zirconia, titania, nickel oxide, polyacrylate, polystyrene, polyphenol, combinations thereof, as well as any others described in U.S. Pat. Nos. 4,943,375, 4,952,321, 4,959,153, 4,960,882, 5,039,419, 5,071,819, 5,078,978, 5,084,430, 5,173,470, 5,179,213, 5,182,251, 5,190,661, 5,244,856, 5,273,660 and 5,393,892, which are herein incorporated by reference. However, other organic resins or any other hydrophilic organic and/or inorganic support materials meeting the above criteria can also be used.

The use of one or more ion binding ligands attached to an SS—A—X— solid support by a covalent linkage spacer group is illustrated in U.S. Pat. Nos. 4,943,375, 4,952,321, 4,959,153, 4,960,882, 5,039,419, 5,071,819, 5,078,978, 5,084,430, 5,173,470, 5,179,213, 5,182,251, 5,190,661, 5,244,856, 5,273,660 and 5,393,892. These patents, which disclose various spacers that can be used in forming an organic ligand attached to a solid support, are incorporated herein by reference. However, a preferred method of attaching the EGTA ligand to the solid support is through one of the carboxyl groups of the EGTA to form an amide.

When the solid support SS is an inorganic material such as silica, silica gel, silicates, zirconia, titania, alumina, nickel oxide and glass beads, the covalent linkage A is a silane such that A—X may be represented by Formula 2 below:

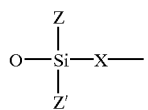

Formula 2

In the above formula, the A portion is Si(Z,Z')—O wherein Z and Z' can independently represent members selected from the group consisting of Cl, Br, I, alkyl, alkoxy, substituted alkyl or substituted alkoxy and O—SS (when SS is an inorganic solid support). When Z and Z' moieties are other than O—SS they are functionally classified as leaving groups, i.e. groups attached to the silicon atom which, when reacted with an Q—SS material, may leave or be replaced by the O—SS. Alkyl or alkoxy preferably mean 1–6 carbon member alkyl or alkoxy group which may be substituted or unsubstituted, straight or branched chain. Substituted groups can include Cl, Br, I, $NO_2$ and the like. The X portion is a spacer grouping is preferably represented by Formula 3 below:

$(CH_2)_mO(CH_2)_n(Q)_p(CH_2)_q[NH(CH_2)_sNH_2]_t$     Formula 3 wherein m, n, q and s are independently integers from about 1 to 20; Q is oxygen(O), sulfur(S) or nitrogen(N); p is 0 or 1; and t is from 0 to 5. It is to be noted that each s variable may be independently an integer from about 1 to 20 regardless of the number of t groups. For example, if t is 3, each of the three s variables represented may be independently an integer from about 1 to 20.

When the SS is a particulate polymeric organic solid support matrix such as polyacrylate, polystyrene, polyphenol and combinations thereof, the A and X elements of Formula 1 may be combined and therefore, may be represented by Formula 4 below:

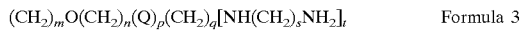

Formula 4 where y is 0 or 1; x and z are independently from about 0 to 10;

and Y is member selected from the group consisting of O, S, C=N, CO, CONH, CSNH, COO, CSO, NH, NR, SO, $SO_2$, $SO_2NH$, $C_6H_4$ and $CH_2C_6H_4$, where R is lower alkyl with the proviso that at least one of x, y and z must be at least 1.

It is to be emphasized that the present invention does not reside in the discovery of the SS—A—X— portion of Formula 1. Rather, it is the discovery that the ion-binding capabilities of the EGTA ligand (L) when attached to an SS—A—X based solid substrate are highly functional for selective ion separation of one species from another.

EGTA ligands covalently bonded to solid supports as shown in Formula 1 are characterized by high selectivity for and removal and/or separation of desired divalent metal ions such as (a) $Ca^{2+}$ from source solutions containing $Mg^{2+}$ and/or other ions, and (b) $Cd^{2+}$ from source solutions containing $Zn^{2+}$ and/or other ions.

The present invention also provides methods for removing desired divalent metal ions from solutions that can contain other metal ions present in much higher concentrations by the use of EGTA ligand bonded solid support materials. The separation is accomplished, even in the presence of other complexing agents or matrix constituents in a separation device, such as a packed column, through which the solution is flowed causing a complex of the desired ions to be formed with ligand bound solid support material packed within the column. The process of selectively removing and concentrating the desired ions is characterized by the ability to quantitatively complex from a larger volume of solution the desired ions, even when they are present at very low concentrations.

The desired ions are recovered from the ligands bound to the solid supports by flowing through a small volume of a receiving phase which contains a solubilizing reagent. The solubilizing reagent need not be selective, but merely be capable of forming a stronger complex with the desired divalent metal ion than does the EGTA ligand. Alternatively, the solubilizing reagent may contain ions that temporarily form a stronger interaction with the EGTA ligand than does the desired metal ions. This causes the desired metal ion to be quantitatively stripped from the solid support material in concentrated form and transferred to the receiving solution. The recovery of the desired metal ion from such a receiving solution is readily accomplished by evaporation, precipitation or by other known methods.

There are several applications for which one may wish to remove/separate the aforementioned divalent metal ions from solution. An example of such an application is the separation of ppb levels of $Cd^{2+}$ or other divalent metals from concentrated Cu, Ni, Zn, Ag, Pb and/or Hg contained in process streams and industrial effluents. This is true both because of the unsatisfactory technologies presently available or because a more economical method is desired. For example, $Cd^{2+}$ is often present at low concentrations in solutions containing other divalent ions at much greater concentrations. Therefore, the removal of $Cd^{2+}$ from such solutions would be important environmentally because of impurity concerns. Additionally, quantitation and/or removal of $Cd^{2+}$ or $Ca^{2+}$ ions from other non-desirable ions may also be employed. Specifically, this removal process may be implemented when the desired ions ($Cd^{2+}$ and/or $Ca^{2+}$) are present at from very low levels (ppb) to very high levels (g/l), even in the presence of concentrated Cu, Ni, Zn, Ag, Pb and/or Hg process streams.

All of these functions and others may be accomplished by use of the compositions and methods of the present invention. The invention will now be illustrated by the following examples which are not intended to be limiting in any way. All references cited are incorporated herein by reference in their entirety.

EXAMPLES

The following examples illustrate the preferred embodiments of the invention that are presently best known. However, other embodiments may be made within the scope of the disclosure. In certain of the examples, reaction schemes are given that are general in nature and reference to the text of each example may be necessary to clarify each reactant, reaction step, reaction condition and product obtained.

Example 1

Preparation of EGTA Bonded to Polyacrylate Resin Beads

To 200 grams of polyacrylate resin beads HP2MG (Mitsubishi) was added 1150 ml of diethylenetriamine. The solution and beads were thoroughly mixed and heated under nitrogen to 185° C. to cause the amine to react with ester groups on the resin and form amine functionalized resin beads. Water was then distilled from the bead containing solution at 183–185° C. for four hours and the concentrated amine functionalized bead containing solution was then cooled to room.temperature. Methanol (0.5 L) was then added and the mixture was stirred for ½ hour and then decanted. The above methanol washing step was repeated 10 times (stirred and decanted repetitively) and finally, the amine functionalized resin beads were filtered and washed one final time with methanol. The functionalized beads were then dried in an oven vacuum and stored at 50° C. To the dried beads was added a solution of 1.0 g of EGTA (Sigma) dissolved in 50 ml of water. The pH of the solution was adjusted to 4.34 by addition of the necessary amount of a 2N solution of sodium hydroxide. To the solution was stirred in 0.4 gram of 1-(3-dimethylaminopropyl)-3-ethylcarbodiimide hydrochloride as an activator. After stirring for five minutes, 1.0 grams of the amine functionalized resin beads were added and the mixture was stirred overnight to affect the reaction between a carboxylic acid group of the EGTA and an activated amine of the amine functionalized resin beads. The product containing EGTA ligand immobilized on the resin beads was then filtered, washed with methanol and dried under a vacuum. The reaction process described above and resulting product are schematically shown in Formula 5 as follows (where the encircled "p" represents a polyacrylate resin bead):

Formula 5

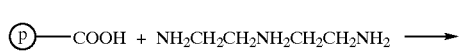

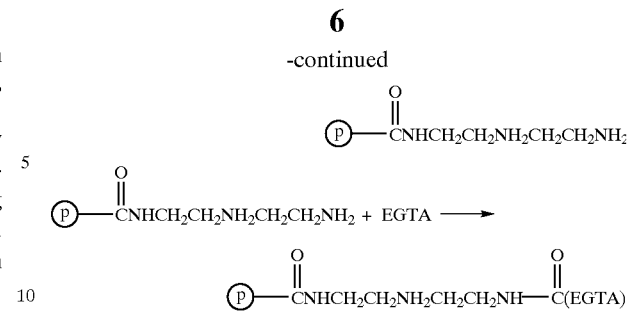

Example 2

Preparation of EGTA Bound to Inorganic Support Particles

To 11.8 g of 3-glycidoxypropyltrimethoxysilane was stirred 3.0 g of ethylenediamine in 50 ml of toluene for 2 days at room temperature. Next, 10.0 g of silica gel (60–100 mesh) was added and the system was heated to 85° C. overnight. The solution was cooled down to room temperature and then the silica gel was washed with $CH_3OH$ and dried in a vacuum oven overnight. The product is shown in Formula 6 below (where the encircled "Si" represents the inorganic support particle):

Formula 6

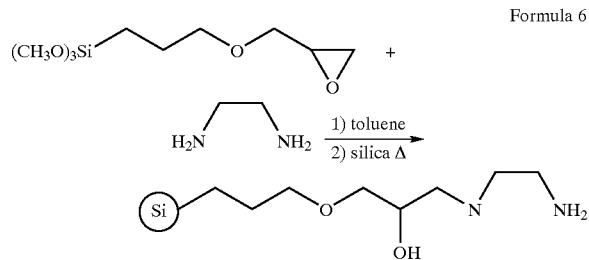

A 1.0 g amount of ethylene glycol bis(β-aminoethyl ether)-N,N,N',N'-tetraacetic acid (Sigma) (EGTA) was dissolved in 50 ml of distilled water. The pH of the system was adjusted to 4.34 with 2N NaOH solution. Next, 0.20 g of 1-(3-dimethylaminopropyl)-3-ethyl-carbodiimide hydrochloride (DEC) was added into the system. After stirring 5 minutes, another 0.20 g was added. After another 15 minutes of stirring, 1.0 g of the amine modified silica gel of Formula 6 was added. The combined solution was stirred overnight at room temperature and then filtered. The EGTA silica product was washed with water and $CH_3OH$ and dried in a vacuum oven overnight. The product prepared is shown in Formula 7 below (where the encircled "Si" represents the inorganic support particle):

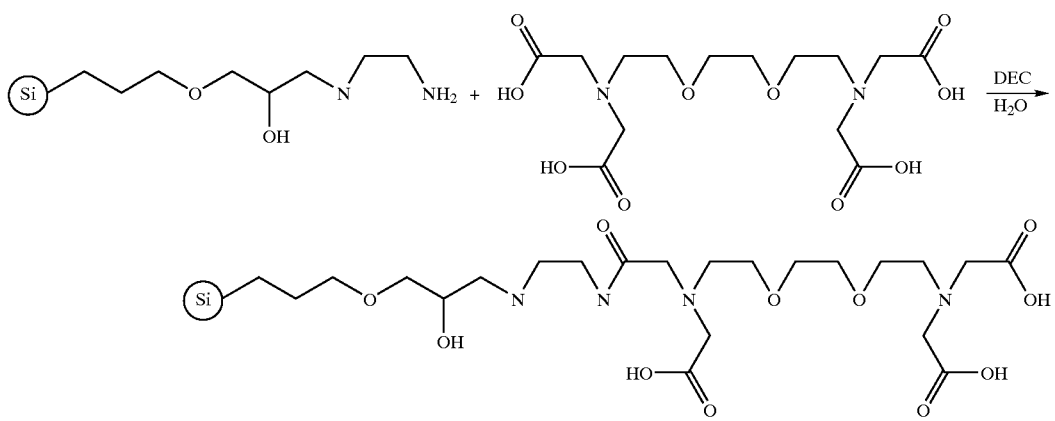

Formula 7

Example 3

Preparation of a Column Packed with Ligand-bound Beads

EGTA bound acrylate beads of 0.5 mm diameter prepared as in Example 1 were cleaned by first soaking with isopropyl alcohol, then distilled deionized water, and finally, with 6 M hydrochloric acid. The beads were then equilibrated with 50 mM Tris-HCL at pH 7.0. Cleaning in this way was found to increase the ion-binding capacity of the EGTA ligand bound to the beads. Two milliliters of the beads were then placed in a suitable column, such as a BioRad® PolyPrep column (0.8 cm×4 cm). The column was packed by passing water through it at 50 psi for 5 minutes. This method resulted in a tight and consistent packing of the beads in the column.

Example 4

Removal of $Ca^{2+}$ Ions from Tris-HCl Buffer

EGTA bound acrylate beads were cleaned and equilibrated as described above in Example 3. The beads were allowed to soak and settle overnight in 1 ml of Tris-HCl buffer (pH 7.0) spiked with $CaCl_2$ and $MgCl_2$. The next morning, the concentration of $Ca^{2+}$ and $Mg^{2+}$ Mg ions in the supernatant were measured. Before addition of the beads, the concentration of $Ca^{2+}$ and $Mg^{2+}$ ions were 1.25 mM and 0.65 mM, respectively. After the overnight soak, the concentration of $Ca^{2+}$ was reduced to 0.02 mM and the concentration of $Mg^{2+}$ remained at about 0.65 mM. As demonstrated in this example, the EGTA ligand is calcium-specific, and has little effect on the concentration of $Mg^{2+}$ ions in solution.

Example 5

Separation of $Cd^{2+}$ from $Zn^{2+}$ Using EGTA Bonded to Polyacrylate

A 0.2 gram column of EGTA-bound 0.5 mm polyacrylate beads was prepared, washed with water and acclimated with 1:1 acetic acid:sodium acetate buffer at pH 4.5. A 5 ml solution containing 6.1 g/l $Zn^{2+}$ and 117 ppm $Cd^{2+}$ in 1:1 acetic acid:sodium acetate buffer was passed through the column at a flow rate of 0.1 ml/min. The $Cd^{2+}$ in the effluent was reduced to 8 ppm while no $Zn^{2+}$ removal was detected. The remaining volume was washed out using 3 ml of water. Finally, the $Cd^{2+}$ was stripped using 3 ml of 0.5 M $HNO_3$ to obtain 154 ppm $Cd^{2+}$ with <1 ppm $Zn^{2+}$ remaining in the eluted $Cd^{2+}$.

While the invention has been described with reference to certain preferred embodiments, those skilled in the art will appreciate that various modifications, changes, omissions, and substitutions can be made without departing from the spirit of the invention.

What is claimed is:

1. A composition for selectively binding metal ions comprising an EGTA ligand covalently bonded to a particulate solid support through a hydrophilic spacer having the formula:

$$SS-A-X-L$$

where SS is a porous or non-porous particulate inorganic or organic polymer solid support, A is a covalent linkage mechanism, X is a hydrophilic spacer grouping, L is an EGTA ligand with the proviso that when SS is a particulate organic polymer, A—X may be combined as a single covalent linkage.

2. A composition according to claim 1 wherein SS is an inorganic solid support selected from the group consisting of sand, silicas, silicates, silica gel, glass, glass beads, glass fibers, alumina, zirconia, titania, nickel oxide and combinations thereof.

3. A composition according to claim 2 wherein A is Si(Z,Z')—O, and wherein Z and Z' are independently members selected from the group consisting of Cl, Br, I, lower alkyl, lower alkoxy, substituted lower alkyl, substituted lower alkoxy and O—SS.

4. A composition according to claim 3 wherein X is represented by the formula:

$$(CH_2)_m O(CH_2)_n (Q)_p (CH_2)_q [NH(CH_2)_s NH_2]_t$$

wherein Q is selected from the group consisting of oxygen (O), sulfur(S) and nitrogen(N); m, n, q and s are integers independently selected from 1 to 20; p is 0 or 1; and t is from 0 to 5.

5. A composition according to claim 1 wherein SS is a particulate organic polymer solid support matrix selected from the group consisting of polyacrylate, polystyrene, polyphenol, and combinations thereof.

6. A composition according to claim 5 wherein A and X combined are represented by the formula:

$$-(CH_2)_x-(Y)_y-(CH_2)_z$$

where y is 0 or 1; x and z are independently integers from 0 to 10; and Y is member selected from the group consisting of O, S, C=N, CO, CONH, CSNH, COO, CSO, NH, NR, SO, SO$_2$, SO$_2$NH, C$_6$H$_4$ and CH$_2$C$_6$H4, where R is lower alkyl with the proviso that at least one of x, y and z must be at least 1.

7. A method for concentrating, removing and separating selected metal ions from a source solution comprising the steps of:

(a) contacting said source solution having a first volume with a composition comprising an EGTA ligand covalently bonded to a particulate solid support through a hydrophilic spacer having the formula:

SS—A—X—L where SS is a particulate solid support, A is a covalent linkage mechanism, X is a hydrophilic spacer grouping, L is an EGTA ion-complexing ligand with the proviso that when SS is a particulate organic polymer, A—X may be combined as a single covalent linkage; wherein said L portion of the composition has an affinity for said selected ions such as to form a complex between said selected ions and said EGTA ligand of said composition;

(b) removing the source solution from contact with said composition to which said selected metal ions have been complexed;

(c) contacting said composition having said selected ions complexed thereto with a second volume of an aqueous receiving solution in which said selected ions are soluble, or which has greater affinity for such selected ions than does the ligand portion of the composition, or which has a greater affinity for said ligand than does the desired metal ion, thereby quantitatively stripping such selected ions from the ligand, said second volume being less than said first volume; and (d) recovering said selected ions in concentrated form in said receiving solution.

8. A method according to claim 7 wherein said selected metal ion is selected from the group consisting of Ca$^{2+}$, Cd$^{2+}$, and combinations thereof.

9. A method according to claim 8 wherein said selected metal ion to be removed is Ca$^{2+}$ and said source solution contains Mg$^{2+}$.

10. A method according to claim 8 wherein said selected metal ion to be removed is Cd$^{2+}$ and said source solution contains Zn$^{2+}$.

11. A method according to claim 7 wherein SS is an inorganic solid support selected from the group consisting of sand, silicas, silicates, silica gel, glass, glass beads, glass fibers, alumina, zirconia, titania, nickel oxide and combinations thereof.

12. A method according to claim 11 wherein A is Si(Z, Z')—O, wherein Z and Z' are independently members selected from the group consisting of Cl, Br, I, lower alkyl, lower alkoxy, substituted lower alkyl, substituted lower alkoxy and O—SS.

13. A method according to claim 12 wherein X is represented by the formula:

(CH$_2$)$_m$O(CH$_2$)$_n$(Q)$_p$(CH$_2$)$_q$[NH(CH$_2$)$_s$NH$_2$]$_t$ wherein Q is a member selected from the group consisting of oxygen(O), sulfur(S) and nitrogen(N); m, n, q and s are integers independently selected from 1 to 20; p is 0 or 1; and t is from 0 to 5.

14. A method according to claim 7 wherein SS is a particulate polymeric organic solid support matrix selected from the group consisting of polyacrylate, polystyrene, polyphenol, and combinations thereof.

15. A method according to claim 14 wherein A and X combined are represented by the formula:

—(CH$_2$)$_x$—(Y)$_y$—(CH$_2$)$_z$— where y is 0 or 1; x and z are independently from 0 to 10; and Y is member selected from the group consisting of O, S, C=N, CO, CONH, CSNH, COO, CSO, NH, NR, SO, S0$_2$, SO2NH, C$_6$H$_4$ and CH$_2$C$_6$H$_4$, where R is lower alkyl with the proviso that at least one of x, y and z must be at least 1.

* * * * *